(12) United States Patent
Miller et al.

(10) Patent No.: US 7,941,265 B2
(45) Date of Patent: May 10, 2011

(54) INDIVIDUAL CYLINDER FUEL MASS CORRECTION FACTOR FOR HIGH DRIVABILITY INDEX (HIDI) FUEL

(75) Inventors: Jon C. Miller, Fenton, MI (US); David S. Mathews, Howell, MI (US); Mark D. Carr, Fenton, MI (US); Ian J. MacEwen, White Lake, MI (US)

(73) Assignee: GM Global Technology Operations LLC

( * ) Notice: Subject to any disclaimer, the term of this patent is extended or adjusted under 35 U.S.C. 154(b) by 168 days.

(21) Appl. No.: 12/361,086

(22) Filed: Jan. 28, 2009

(65) Prior Publication Data

US 2010/0191445 A1    Jul. 29, 2010

(51) Int. Cl.
*G01L 23/22* (2006.01)
*G01L 23/00* (2006.01)

(52) U.S. Cl. ......................................... 701/111

(58) Field of Classification Search .................. 701/111, 701/103, 104; 123/406.21, 406.29, 406.37, 123/406.47; 73/35.01, 35.02
See application file for complete search history.

(56) References Cited

U.S. PATENT DOCUMENTS

| | | | |
|---|---|---|---|
| 5,778,855 A * | 7/1998 | Czekala et al. | 123/406.27 |
| 6,295,808 B1 * | 10/2001 | Griffin et al. | 60/776 |
| 6,938,466 B2 * | 9/2005 | Bonadies et al. | 73/114.53 |
| 2009/0265081 A1 * | 10/2009 | Shibata et al. | 701/104 |

* cited by examiner

*Primary Examiner* — Mahmoud Gimie

(57) ABSTRACT

A system includes a fuel detection module, a misfire detection module, and a fuel control module. The fuel detection module detects when a fuel supplied to an engine having C cylinders has a high drivability index (HIDI), where C is an integer greater than 1. The misfire detection module detects whether M of the C cylinders misfire when the fuel has the HIDI, where M is an integer, and $1 \leq M < C$. The fuel control module injects a first amount of the fuel into the M of the C cylinders when M is less than or equal to D, where D is an integer less than C, and where the first amount is greater than a first predetermined amount.

18 Claims, 3 Drawing Sheets

INDIVIDUAL CYLINDER FUEL MASS CORRECTION FACTOR FOR HIGH DRIVABILITY INDEX (HIDI) FUEL

FIELD

The present disclosure relates to fuel systems, and more particularly to systems and methods for controlling fuel injected into cylinders of an internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine compresses and ignites a mixture of air and fuel in one or more cylinders to produce engine power. If the mixture fails to ignite and/or completely burn, an incomplete combustion results in a cylinder misfiring. Misfiring of cylinders can damage engine components, produce unwanted emissions, and/or impact fuel economy.

Cylinders can misfire when the mixture is lean. The mixture may be lean due to various reasons. For example, the mixture may be lean when fuel injectors are partially clogged and/or when the fuel has a high drivability index (HIDI). The HIDI affects fuel combustion as follows.

Fuel is commonly characterized by fuel distillation curves. The fuel distillation curves plot percentages of fuel vaporization as a function of fuel temperature. Normally, X % of fuel may evaporate at a temperature T. Accordingly, Y amount of fuel may yield an air-to-fuel ratio of R at temperature T. However, when the drivability index of the fuel is high, a temperature greater than T is required to evaporate X % of the fuel having the HIDI. Accordingly, when the drivability index of the fuel is high, more than Y amount of fuel is required to obtain the air-to-fuel ratio of R at temperature T.

SUMMARY

A system comprises a fuel detection module, a misfire detection module, and a fuel control module. The fuel detection module detects when a fuel supplied to an engine having C cylinders has a high drivability index (HIDI), where C is an integer greater than 1. The misfire detection module detects whether M of the C cylinders misfire when the fuel has the HIDI, where M is an integer, and $1 \leq M < C$. The fuel control module injects a first amount of the fuel into the M of the C cylinders when M is less than or equal to D, where D is an integer less than C, and where the first amount is greater than a first predetermined amount.

The fuel control module injects the first amount of the fuel into each one of the C cylinders when M is greater than D. The fuel control module increases the first amount until the first amount is equal to a second predetermined amount that is greater than the first predetermined amount. When the first amount is greater than or equal to the second predetermined amount, the fuel control module stops injecting the first amount of the fuel into the M of the C cylinders if at least one of the C cylinders misfire.

A method comprises detecting when a fuel supplied to an engine having C cylinders has a high drivability index (HIDI), where C is an integer greater than 1. The method further comprises detecting whether M of the C cylinders misfire when the fuel has the HIDI, where M is an integer, and $1 \leq M < C$. The method further comprises injecting a first amount of the fuel into the M of the C cylinders when M is less than or equal to D, where D is an integer less than C, and where the first amount is greater than a first predetermined amount.

The method further comprises injecting the first amount of the fuel into each one of the C cylinders when M is greater than D. The method further comprises increasing the first amount until the first amount is equal to a second predetermined amount that is greater than the first predetermined amount. The method further comprises stopping injecting the first amount of the fuel into the M of the C cylinders when the first amount is greater than or equal to the second predetermined amount and when at least one of the C cylinders misfire.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
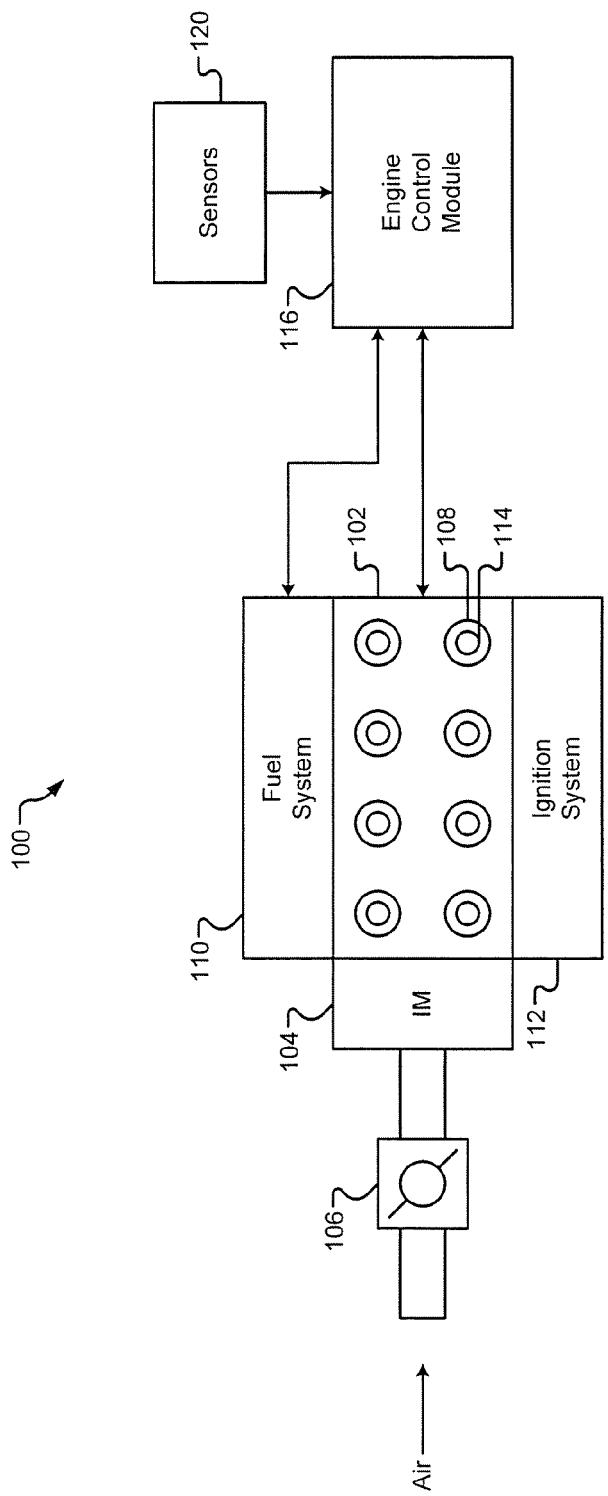
FIG. 1 is a functional block diagram of an exemplary engine control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Misfiring of cylinders caused by lean air and fuel mixtures can be prevented by selectively injecting additional fuel only into cylinders that misfire. Selectively injecting additional fuel only into the cylinders that misfire and not into cylinders that perform optimally can improve the longevity, emissions, and/or the fuel economy of internal combustion engines.

Referring now to FIG. 1, a functional block diagram of an exemplary engine control system 100 is shown. The engine control system 100 comprises an engine 102, an intake module (IM) 104, a throttle 106, cylinders 108, a fuel system 110, an ignition system 112, pistons 114, an engine control module 116, and sensors 120.

Air is drawn into the intake module 104 through the throttle 106 and distributed into the cylinders 108 of the engine 102. The fuel system 110 injects fuel into the cylinders 108. The air mixes with the fuel in the cylinders 108 to form an air/fuel mixture that is compressed and ignited by the ignition system 112 to drive the pistons 114. The pistons 114 drive a crankshaft (not shown) of the engine 102 to provide a drive torque output.

The engine control module 116 controls the operation of the engine control system 100 based on various operating parameters detected by one or more sensors 120. The operating parameters may include, for example, humidity, temperature, and/or air pressure. The sensors 120 generate one or more signals based on the operating parameters. The engine control module 116 controls the engine 102 and the fuel system 110 based on the signals generated by the sensors 120.

Figure 2:
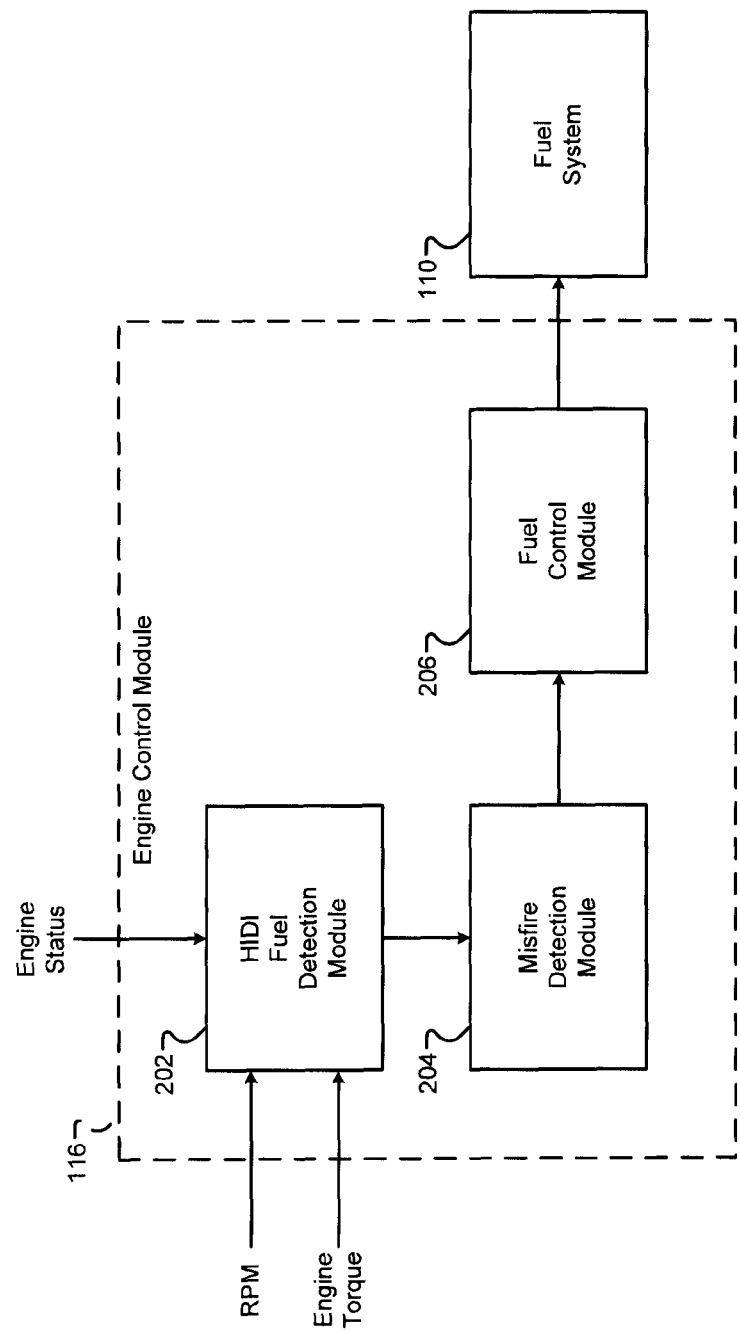
FIG. 2 is a functional block diagram of an exemplary engine control module of the engine control system of FIG. 1 according to the present disclosure.

Referring now to FIG. 2, a functional block diagram of an exemplary engine control module 116 is shown. The engine control module 116 includes a high drivability index (HIDI) fuel detection module 202, a misfire detection module 204, and a fuel control module 206. The HIDI fuel detection module detects whether the fuel supplied to the engine 102 has the HIDI. When the fuel has the HIDI, the misfire detection module 204 detects cylinders that misfire. When the misfired cylinders are detected, the fuel control module 206 selectively injects additional fuel only into the misfiring cylinders.

The HIDI fuel detection module 202 determines the drivability index of the fuel when the engine 102 is cranked on. The HIDI fuel detection module 202 receives an engine status signal and an engine torque signal from the engine 102. One or more of the sensors 120 may generate the engine status signal and the engine torque signal when the engine 102 is cranked on. Additionally, the HIDI fuel detection module 202 receives an engine speed signal from one of the sensors 120 when the engine 102 is cranked on. The engine speed signal may indicate the engine speed in revolutions-per-minute (RPM).

The engine status signal includes an engine start signal that is received when the engine 102 is started (i.e., when the engine 102 is cranked on). One or more of the sensors 120 may generate the engine start signal. The engine start signal may be asserted for a predetermined period of time. For example, the predetermined period of time may be 1-5 minutes. The predetermined period of time may be determined based on various ambient parameters. For example, the ambient parameters may include outdoor humidity and outdoor temperature. The HIDI fuel detection module 202 is enabled when the engine status signal includes the engine start signal.

When enabled, the HIDI fuel detection module 202 determines whether the fuel has the HIDI based on the RPM and the engine torque signals. For example only, HIDI fuel detection module 202 may determine that the fuel has the HIDI when the product of a delta RPM ratio and an engine torque ratio is greater than a predetermined value. When the fuel has the HIDI, the HIDI fuel detection module 202 enables the misfire detection module 204.

When enabled, the misfire detection module 204 determines if any of the cylinders 108 has misfired. The commonly assigned U.S. patent application Ser. No. 11/390,974 titled "Misfire Detection Apparatus for Internal Combustion Engine Based on Piston Speed" filed on Mar. 28, 2006 discloses systems and methods for detecting misfiring cylinders. The application is incorporated herein by reference in its entirety.

The misfire detection module 204 detects the number of cylinders 108 that misfire (hereinafter misfiring cylinders). For example, the misfire detection module 204 may count a number of times any of the cylinders 108 misfires (i.e., a misfire count). The misfire detection module 204 generates a control signal for each of the misfiring cylinders when the misfire count for any of the misfiring cylinders is greater than zero (i.e., when the cylinder misfires). The misfire detection module 204 may reset the misfire counts of the misfiring cylinders after a predetermined number of engine cycles (e.g., 100 engine cycles).

The fuel control module 206 receives information that includes the number of misfiring cylinders, the misfire counts for the misfiring cylinders, and the control signals from the misfire detection module 204. Based on the information and the control signals, the fuel control module 206 determines whether the number of misfiring cylinders is greater than or equal to a predetermined number. When the number of misfiring cylinders is greater than the predetermined number, the fuel control module 206 determines that a majority of the cylinders 108 are misfiring.

When the majority of the cylinders 108 are misfiring, the fuel control module 206 generates a first fuel control signal. The fuel system 110 enriches (i.e., injects more fuel into) all of the cylinders 108 when the fuel system 110 receives the first fuel control signal. When the number of misfiring cylinders is less than the predetermined value, the fuel control module 206 generates a second fuel control signal. The fuel system 110 enriches only the cylinders 108 that misfire when the fuel system 110 receives the second fuel control signal.

When the majority of the cylinders 108 misfire, the fuel system 110 enriches or injects a predetermined amount of fuel into all of the cylinders 108. When less than the majority of the cylinders 108 misfire, the fuel system 110 enriches or injects the predetermined amount of fuel into only the cylinders 108 that misfire (i.e., the misfiring cylinders).

When the fuel system 110 enriches all or only the misfiring cylinders, the fuel control module 206 determines a total amount of enrichment (i.e., a cumulative or total amount of fuel) used to enrich the cylinders. A maximum enrichment is a predetermined maximum amount of fuel that may be used to enrich the cylinders. When the total enrichment is greater than or equal to the maximum enrichment, the misfire detection module 204 determines whether any of the cylinders being enriched are still misfiring. If any of the cylinders being enriched continue to misfire despite the maximum enrichment, the fuel control module 206 aborts enriching the cylinders. The enrichment is aborted since the enrichment does not prevent, correct, and or reduce the misfiring.

Figure 3:
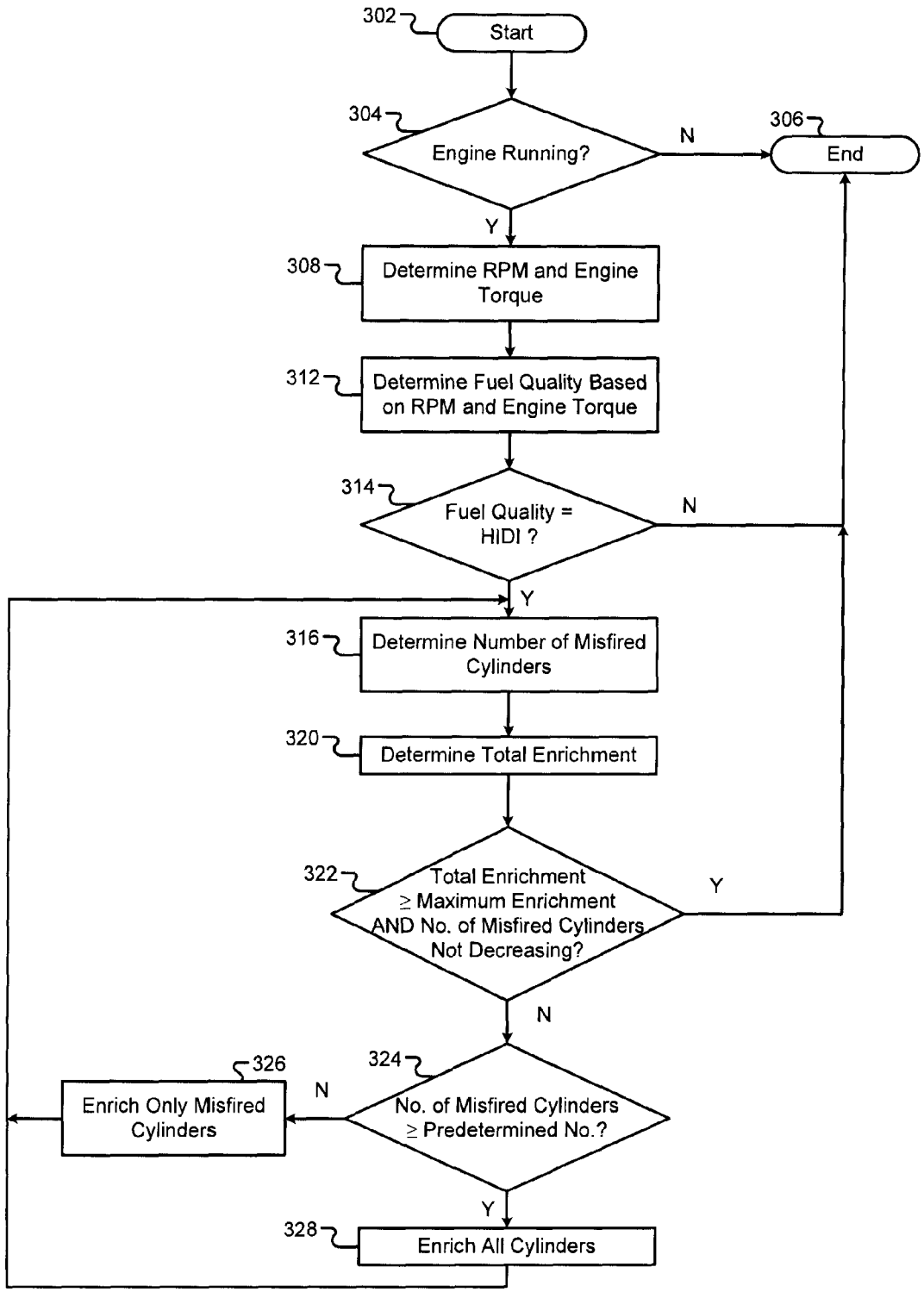
FIG. 3 depicts a flowchart of exemplary steps executed by the engine control module of FIG. 2 according to the present disclosure.

Referring now to FIG. 3, a flowchart depicting exemplary steps performed by the engine control module 116 is shown. Control begins in step 302. Control determines in step 304 whether the engine is running. Control ends in step 306 if the result of step 304 is false. Control proceeds to step 308 if the result of step 306 is true.

In step 308, control determines the RPM and the engine torque. In step 312, control determines the fuel quality based on the RPM and the engine torque. In step 314, control determines whether the fuel has the HIDI. Control ends in step 306 if the result of step 314 is false. Control proceeds to step 316 if the result of step 314 is true.

In step 316, control determines the number of misfired cylinders. In step 320, control determines total enrichment. In step 322, control determines whether the total enrichment is greater than or equal to the maximum enrichment and whether the number of misfired cylinders is not decreasing. Control ends in step 306 if the result of step 322 is true. Control proceeds to step 324 if the result of step 320 is false.

In step 324, control determines if the number of misfired cylinders is greater than or equal to a predetermined number.

Control proceeds to step 326 if the result of step 324 is false. Control proceeds to step 328 if the result of step 324 if true. Control enriches only the misfiring cylinders in step 326. Control enriches all of the cylinders 108 in step 328. At the end of step 326 or 328, control returns to step 316.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a fuel detection module that detects when a fuel supplied to an engine having C cylinders has a high drivability index (HIDI), where C is an integer greater than 1;
   a misfire detection module that detects whether M of said C cylinders misfire when said fuel has said HIDI, where M is an integer, and $1 \leq M < C$; and
   a fuel control module that injects a first amount of said fuel into said M of said C cylinders when M is less than or equal to D, where D is an integer less than C, wherein said first amount is greater than a first predetermined amount.

2. The system of claim 1 wherein said fuel control module injects said first amount of said fuel into each one of said C cylinders when M is greater than D.

3. The system of claim 1 wherein said fuel control module increases said first amount until said first amount is equal to a second predetermined amount that is greater than said first predetermined amount.

4. The system of claim 3 wherein when said first amount is greater than or equal to said second predetermined amount, said fuel control module stops injecting said first amount of said fuel into said M of said C cylinders if at least one of said C cylinders misfire.

5. The system of claim 1 wherein said fuel detection module detects said HIDI fuel based on at least one of an engine speed and an engine torque of said engine.

6. The system of claim 1 wherein said fuel detection module detects said HIDI fuel when said engine is turned on.

7. The system of claim 6 wherein said fuel detection module detects said HIDI fuel for a predetermined period of time after said engine is turned on.

8. The system of claim 7 wherein said predetermined period of time is based on ambient conditions.

9. The system of claim 8 wherein said ambient conditions include at least one of ambient humidity and ambient temperature.

10. A method comprising:
    detecting when a fuel supplied to an engine having C cylinders has a high drivability index (HIDI), where C is an integer greater than 1;
    detecting whether M of said C cylinders misfire when said fuel has said HIDI, where M is an integer, and $1 \leq M < C$; and
    injecting a first amount of said fuel into said M of said C cylinders when M is less than or equal to D, where D is an integer less than C, wherein said first amount is greater than a first predetermined amount.

11. The method of claim 10 further comprising injecting said first amount of said fuel into each one of said C cylinders when M is greater than D.

12. The method of claim 10 further comprising increasing said first amount until said first amount is equal to a second predetermined amount, where said second predetermined amount is greater than said first predetermined amount.

13. The method of claim 12 further comprising stopping injecting said first amount of said fuel into said M of said C cylinders when said first amount is greater than or equal to said second predetermined amount and when at least one of said C cylinders misfire.

14. The method of claim 10 further comprising detecting said HIDI fuel based on at least one of an engine speed and an engine torque of said engine.

15. The method of claim 10 further comprising detecting said HIDI fuel when said engine is turned on.

16. The method of claim 15 further comprising detecting said HIDI fuel for a predetermined period of time after said engine is turned on.

17. The method of claim 16 further comprising generating said predetermined period of time based on ambient conditions.

18. The method of claim 17 further comprising generating said predetermined period of time based on at least one of ambient humidity and ambient temperature.

* * * * *